(12) United States Patent
Fleming

(10) Patent No.: US 7,653,750 B2
(45) Date of Patent: Jan. 26, 2010

(54) USING A DIRECTORY SERVICE FOR A USER REGISTRY

(75) Inventor: Patrick Jerome Fleming, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 11/751,703

(22) Filed: May 22, 2007

(65) Prior Publication Data

US 2007/0220015 A1 Sep. 20, 2007

Related U.S. Application Data

(62) Division of application No. 09/799,902, filed on Mar. 6, 2001, now Pat. No. 7,240,125.

(51) Int. Cl.
*G06F 15/16* (2006.01)
(52) U.S. Cl. ............... 709/246; 709/217; 709/218; 709/219; 709/230
(58) Field of Classification Search ......... 709/217–219, 709/230, 246
See application file for complete search history.

(56) References Cited

U.S. PATENT DOCUMENTS

| | | | |
|---|---|---|---|
| 6,012,098 A | 1/2000 | Bayeh et al. | |
| 6,125,391 A | 9/2000 | Meltzer et al. | |
| 6,208,986 B1 | 3/2001 | Schneck et al. | |
| 6,324,538 B1 | 11/2001 | Wesinger et al. | |
| 6,470,426 B2 | 10/2002 | Burnett | |
| 6,496,855 B1 | 12/2002 | Hunt et al. | |
| 6,560,633 B1 | 5/2003 | Roberts et al. | |
| 6,591,260 B1 | 7/2003 | Schwarzhoff et al. | |
| 6,601,065 B1 | 7/2003 | Nelson et al. | |
| 6,601,071 B1 | 7/2003 | Bowker et al. | |
| 6,658,389 B1 | 12/2003 | Alpdemir | |
| 6,662,199 B1 | 12/2003 | Flight et al. | |
| 6,694,375 B1 * | 2/2004 | Beddus et al. | ............... 709/249 |
| 6,708,170 B1 | 3/2004 | Byrne et al. | |
| 6,718,380 B1 | 4/2004 | Mohaban et al. | |
| 6,792,605 B1 | 9/2004 | Roberts et al. | |
| 6,871,220 B1 | 3/2005 | Rajan et al. | |
| 6,879,965 B2 * | 4/2005 | Fung et al. | .................... 705/39 |
| 7,080,030 B2 * | 7/2006 | Eglen et al. | ................... 705/26 |
| 7,168,094 B1 * | 1/2007 | Fredell | ....................... 726/29 |
| 2001/0034733 A1 | 10/2001 | Prompt et al. | |
| 2002/0032775 A1 * | 3/2002 | Venkataramaiah et al. | .. 709/225 |
| 2002/0073343 A1 * | 6/2002 | Ziskind et al. | .............. 713/202 |
| 2004/0044652 A1 | 3/2004 | Ito | |
| 2005/0131815 A1 * | 6/2005 | Fung et al. | ..................... 705/39 |

OTHER PUBLICATIONS

James Tauber et al., "Directory Services Markup Language (DSML)", Dec. 2, 1999, http://www.dsmltools.org/dsml/org/dsml.html.

* cited by examiner

*Primary Examiner*—Vivek Srivastava
*Assistant Examiner*—Thomas Duong
(74) *Attorney, Agent, or Firm*—Martin & Associates, LLC

(57) ABSTRACT

An apparatus and method provide an architected way for a web server to access a user registry in a directory service such as LDAP. In the preferred embodiments, the logic for presenting and processing a web page is encapsulated from the logic that interacts with the directory service, making it easy for a programmer to make changes to the a user registration form without having to have a detailed knowledge of the directory service and its interfaces.

10 Claims, 9 Drawing Sheets

```
                    Register with Us!
First Name: [Joe]              Last Name: [Miller]
UserID:     [millerj]          Password:  [********]
eMail:      [millerj@ibm.com]  Telephone: [507-555-1234]
                                    710                    720
              ( Submit )              ( Cancel )
```

FIG. 7

```
<?xml verson="1.0">
<VisitorRegistrationInfo>
    <FirstName>Joe</FirstName><LastName>Miller</LastName>
    <UserID>millerj</UserID><Password>myPassword</Password>
    <eMail>millerj@ibm.com</eMail><Telephone>507-555-1234</Telephone>
</VisitorRegistrationInfo>
```

FIG. 8

```
<dsml:entry dn="uid=miller,ou=rochester,O=ibm,c=us">
   <dsml:objectclass>
      <dsml:oc-value>inetOrgPerson</dsml:oc-value>
      <dsml:oc-value>AFVisitor</dsml:oc-value>
   </dsml:objectclass>
   <dsml:attr name="cn"><dsml:value>Joe Miller</dsml:value></dsml:attr>
   <dsml:attr name="sn"><dsml:value>Miller</dsml:value></dsml:attr>
   <dsml:attr name="uid"><dsml:value>millerj</dsml:value></dsml:attr>
   <dsml:attr name="userPassword"><dsml:value>myPassword</dsml:value></dsml:attr>
   <dsml:attr name="givenname"><dsml:value>Joe</dsml:value></dsml:attr>
   <dsml:attr name="mail"><dsml:value>millerj@ibm.com</dsml:value></dsml:attr>
   <dsml:attr name="telephoneNumber"><dsml:value>507-555-1234</dsml:value></dsml:attr>
</dsml:entry>
```

FIG. 9

```
<?xml version="1.0"?>
<xsl:stylesheet xmlns:xsl="http://www.w3.org/1999/XSL/Transform" version="1.0">

<xsl:template match="VisitorRegistrationInfo">
<dsml:dsml xmlns:dsml="http://ww.dsml.org/DSML">
  <dsml:directory-entries>
    <dsml:entry dn="uid={$uid},{$parentDN}>
      <dsml:objectclass>
        <dsml:oc-value>inetorgperson</dsml:oc-value>
        <dsml:oc-value>AFVisitor</dsml:oc-value>
      <dsml:objectclass>
      <dsml:attr name="sn"><dsml:value><xsl:value-of select="//LastName"/></dsml:value></dsml:attr>
      <dsml:attr name="mail"><dsml:value><xsl:value-of select="//eMail"/></dsml:value></dsml:attr>
    </dsml:entry>
  </dsml:directory-entries>
</dsml:dsml>
  </xsl:template>
</xsl:stylesheet>
```

FIG. 10

```
dn:cn=schema
changetype:modify
add:attributetypes
attributetypes:( userInterests-oid NAME 'userInterests' SYNTAX
1.3.6.1.4.1.1466.115.121.1.15 )
ibmattributetypes:( userInterests-oid ACCESS-CLASS normal LENGTH 256 )

Dn:cn=schema
Changetype:modify
add:objectclasses
objectclasses:(Visitor-oid NAME 'Visitor' SUP top AUXILIARY MAY ( userInterests ) )
```

FIG. 11

USING A DIRECTORY SERVICE FOR A USER REGISTRY

REFERENCE TO PARENT APPLICATION

This application is a divisional of patent application "APPARATUS AND METHOD FOR USING A DIRECTORY SERVICE FOR A USER REGISTRY", Ser. No. 09/799,902 filed by Patrick J. Fleming, on Mar. 6, 2001, which is incorporated herein by reference.

BACKGROUND OF THE INVENTION

1. Technical Field

This invention generally relates to computer systems and more specifically relates to an apparatus and method for tracking users of a computer system.

2. Background Art

Since the dawn of the computer age, computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users to communicate with each other.

One significant computer network that has recently become very popular is the Internet. The Internet grew out of this proliferation of computers and networks, and has evolved into a sophisticated worldwide network of computer system resources commonly known as the "world-wide-web", or WWW. A user at an individual PC (i.e., workstation) that wishes to access the Internet typically does so using a software application known as a web browser. A web browser makes a connection via the Internet to other computers known as web servers, and receives information from the web servers that is rendered to the user's workstation. Information transmitted from the web server to the web browser is generally formatted using a specialized language called Hypertext Markup Language (HTML) and is typically organized into pages known as web pages.

Web servers (or web sites) often need to maintain a list of users who have registered with the web server. This list is often referred to as a "user registry." The user registry contains information about the user that allows the web server to authenticate and authorize the user, and to customize information presented to the user. Past web server applications included a custom user registry. This required each application to maintain its own user registry.

The development of directory services has made it possible to share information between applications in an efficient manner. LDAP is the Lightweight Directory Access Protocol which is one example of a known protocol for accessing a directory service in a computer network such as the Internet. With the commercial acceptance of LDAP, several web server applications may now access a common user registry by providing logic that accesses Application Programming Interfaces (APIs) that interact with the LDAP directory in a defined manner. However, this requires that each application understand the schema for the LDAP directory and contain the logic for interacting with the LDAP directory. This places a large burden on each application that must be maintained as the application changes. Without an apparatus and method for encapsulating different portions of code for a user registry in a directory service into different segments that may be separately maintained, programmers will be forced to continue to provide user registry logic and directory service interface logic in each application, thereby providing a great duplication of effort resulting in unnecessary effort and cost to the industry.

DISCLOSURE OF INVENTION

According to the preferred embodiments, an apparatus and method provide an architected way for a web server to access a user registry in a directory service such as LDAP. In the preferred embodiments, the logic for presenting a web page is encapsulated from the logic that interacts with the directory service, making it easy for a programmer to make changes to the a user registration form without having to have a detailed knowledge of the directory service and its interfaces.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 7 is a diagram of a sample display window that is displayed to a user to collect registration information for the user;

FIG. 8 is a sample XML document that is constructed in accordance with the preferred embodiments from the information in the display window of FIG. 7;

FIG. 9 is a sample DSML document that is generated in accordance with the preferred embodiments from the XML document of FIG. 8;

FIG. 10 is a sample Extensible Stylesheet Language (XSL) stylesheet that is used to convert the XML document of FIG. 8 to the DSML document of FIG. 9;

FIG. 11 is a sample LDIF file in accordance with the preferred embodiments that is used to modify the schema in the directory service.

BEST MODE FOR CARRYING OUT THE INVENTION

Overview

The method and apparatus of the present invention has particular applicability to users that access information via the Internet, and to the use of directory services on a web server. For those individuals who are not familiar with the Internet or with directory services, a brief overview of relevant concepts is presented below.

Internet

Figure 1:
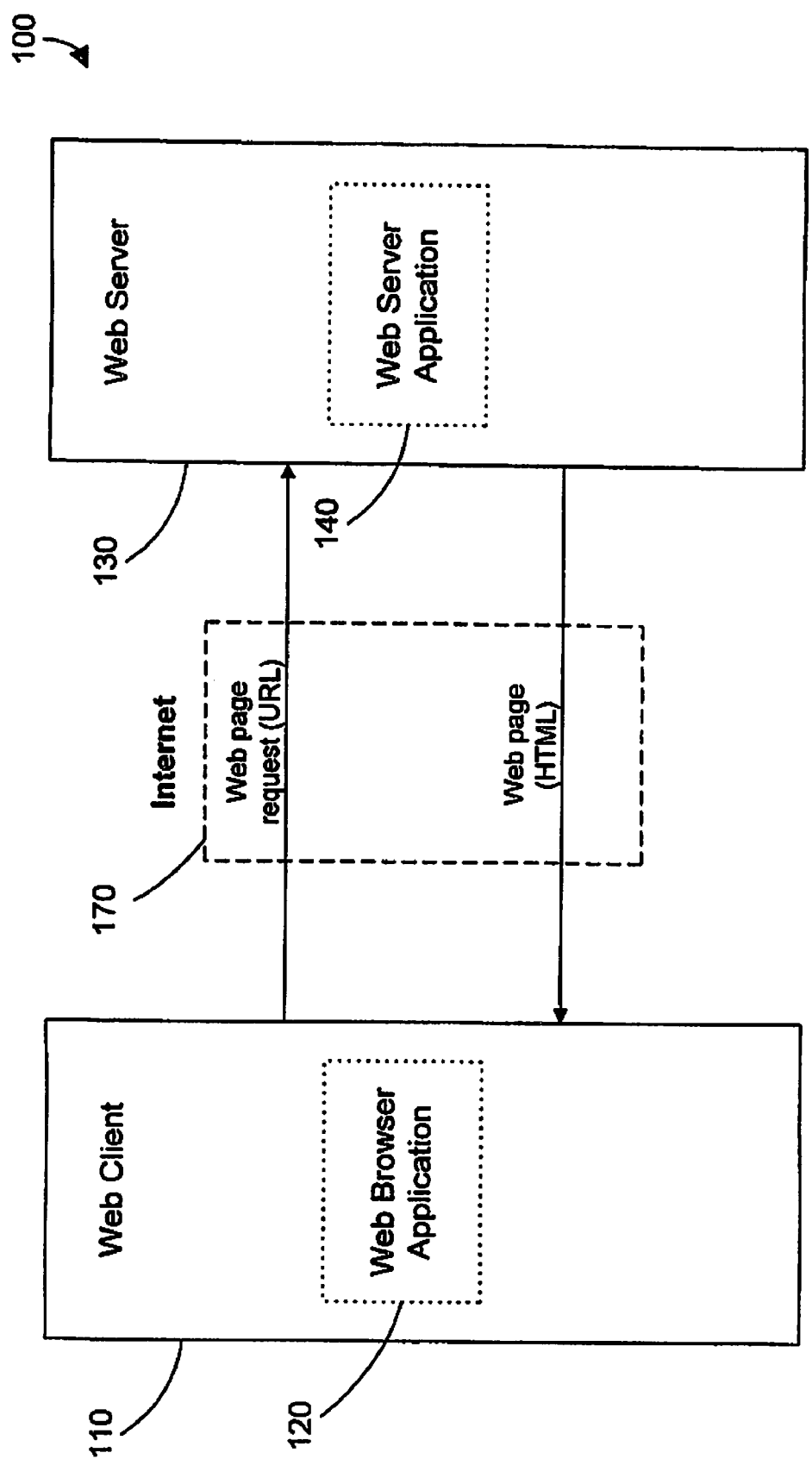
FIG. 1 is a block diagram of a prior art client/server computer system for accessing information via the Internet.

An example of a typical Internet connection is shown by the apparatus 100 in FIG. 1. A user that wishes to access information on the Internet 170 typically has a computer workstation 110 (referred to as a "web client") that executes an application program known as a web browser 120. Under the control of web browser 120, web client workstation 110 sends a request for a web page over the Internet 170. Each web server on the Internet has a known address, termed the Uniform Resource Locator (URL), which the web browser uses to connect to the appropriate web server. Because web server 130 can contain more than one web page, the user will also specify in the address which particular web page he or she wants to view on web server 130. A web server computer system 130 executes a web server application 140, monitors requests, and services requests for which it has responsibility. When a request specifies web server 130, web server application 140 generally accesses a web page corresponding to the specific request, and transmits the web page to the web browser 120 on the user's workstation 110. Known web browsers include Netscape Communicator and Microsoft Internet Explorer.

A web page may contain various types of data, including text, graphics and other forms of information, collectively known as MIME data. Most web pages include visual data that is intended to be displayed on the monitor of user workstation 110. Web pages are generally written in Hypertext Markup Language (HTML) or as Java server pages (.jsp files). When web server 130 receives a web page request, it will send the requested web page across the Internet 170 to the requesting web browser 120. Web browser 120 understands HTML and Java and interprets the web page and outputs the web page to the monitor (or display) of user workstation 110. This web page displayed on the user's screen may contain any suitable MIME data, including text, graphics, audio elements, video elements, and links (which reference addresses of other web pages). The user can invoke other web pages by clicking on these links using a mouse or other pointing device. This entire system of web pages with links to other web pages on other servers across the world is known as the "World Wide Web".

One function that is common among many web sites is the need to "register" users to the web site. The registration may serve one or more important functions, such as: receiving from the user security information to allow the user to access the web site; customizing the presentation of web pages according to the answers to questions in a questionnaire that is provided to the user during registration; allowing the user to enter credit card information for purchases at the web site; and many other functions.

Figure 2:
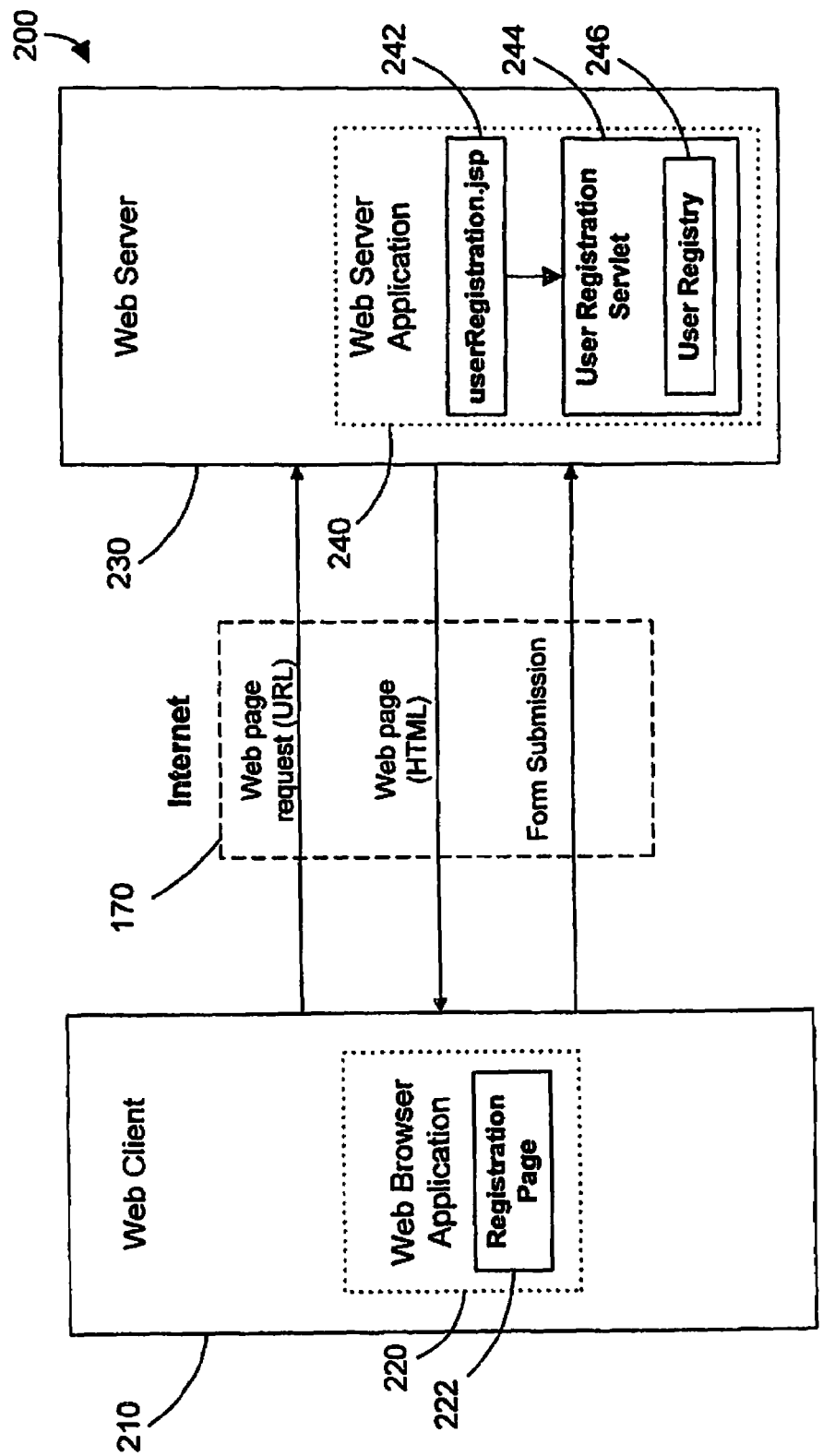
FIG. 2 is a block diagram of a prior art client/server computer system that includes a user registry.

Referring now to FIG. 2, an apparatus 200 includes a client/server computer system that includes a web client 210 connected to a web server 230 via the Internet 170. The web browser application 220 on the web client 210 receives web pages (such as registration page 222) from the web server application 240 in the web server computer system 230. We assume that a web server application 240 includes a userRegistration.jsp program, which is a Java server page that is sent as a registration page 222 to the web browser 220. Registration page 222 is preferably a form that a user can use to submit required information so register with the web site. The user fills in the form with appropriate information, then clicks on a "submit" (or equivalent) button on the registration page 222 to submit the information in the form to the web server application 240. The form information is passed to a userRegistration servlet 244, which takes the data in the form and places it in a dedicated user registry 246 within the user registration servlet 244.

One significant disadvantage of having a user registry 246 within a user registration servlet 244 is that the user registry 246 is only accessible to the user registration servlet 244, and hence the web server application 240 that includes the user registration servlet 244. In most web server computer system, there are a multitude of web server applications (like 240 in FIG. 2) all executing at the same time. If each web server application has to build its own user registry, a great duplication of effort will occur in the coding of each web server application. Recent developments centralize information in a directory service that allows multiple applications to access the same data. One example of a known directory service access method is Lightweight Directory Access Protocol (LDAP), discussed below.

LDAP

LDAP is the Lightweight Directory Access Protocol which is a known protocol for accessing a directory service in a computer network such as the Internet. The predecessor for LDAP is Directory Access Protocol (DAP), which is part of X.500, a standard for directory services in a network. DAP is very powerful, but has substantial overhead as well. Researchers at the University of Michigan developed LDAP in an attempt to "lighten up" DAP to provide many of its benefits without all of the associated overhead. Their attempts have met with resounding success as measured by the widespread acceptance by many companies of LDAP as a standard for networked directory services.

LDAP is a directory service that runs over Transmission Control Protocol/Internet Protocol (TCP/IP). The LDAP directory service follows a client/server model. One or more LDAP servers contain the directory data. An LDAP client connects to an LDAP server and makes a request. The server responds with a reply, or with a pointer (or referral) to another LDAP server. Because LDAP is a directory service, rather than a database, the information in an LDAP directory is usually descriptive, attribute-based information. LDAP users generally read the information in the directory much more often than they change it. Updates are typically simple, all-or-nothing changes. Common uses of LDAP directories include online telephone directories and e-mail directories, and more recently, user registries.

The LDAP information model is based on an "entry", which contains information about some object. Entries are typically organized into a specified tree structure, the organization of which is defined by a Directory Information Tree (DIT). LDAP defines a number of directory service operations with respect to the tree and data contained therein including authentication, search and retrieval, entry addition/deletion, and entry modification.

In an LDAP directory, an entry is a collection of attributes that has a name, called a distinguished name (DN). The DN is used to refer to the entry unambiguously. Each of the entry's attributes has a type and one or more values. The types are typically mnemonic strings, like "cn" for common name or "mail" for an e-mail address. The values depend on what type of attribute it is. For example, a mail attribute might contain a text e-mail address, while a jpegPhoto attribute would contain a photograph in binary JPEG/JFIF format.

LDAP allows control over which attributes are required and allowed in an entry through the use of a special attribute called objectclass. The values of the objectclass attribute determine the schema rules the entry must obey. An entry is referenced by its distinguished name, which is constructed by taking the name of the entry itself (called the relative distinguished name, or RDN) and concatenating the names of its ancestor entities. Details of LDAP are available in W. Yeong, T. Howes, and S. Kille, "Lightweight Directory Access Protocol", Network Working Group, Request for Comments: 1777, March 1995.

Figure 3:
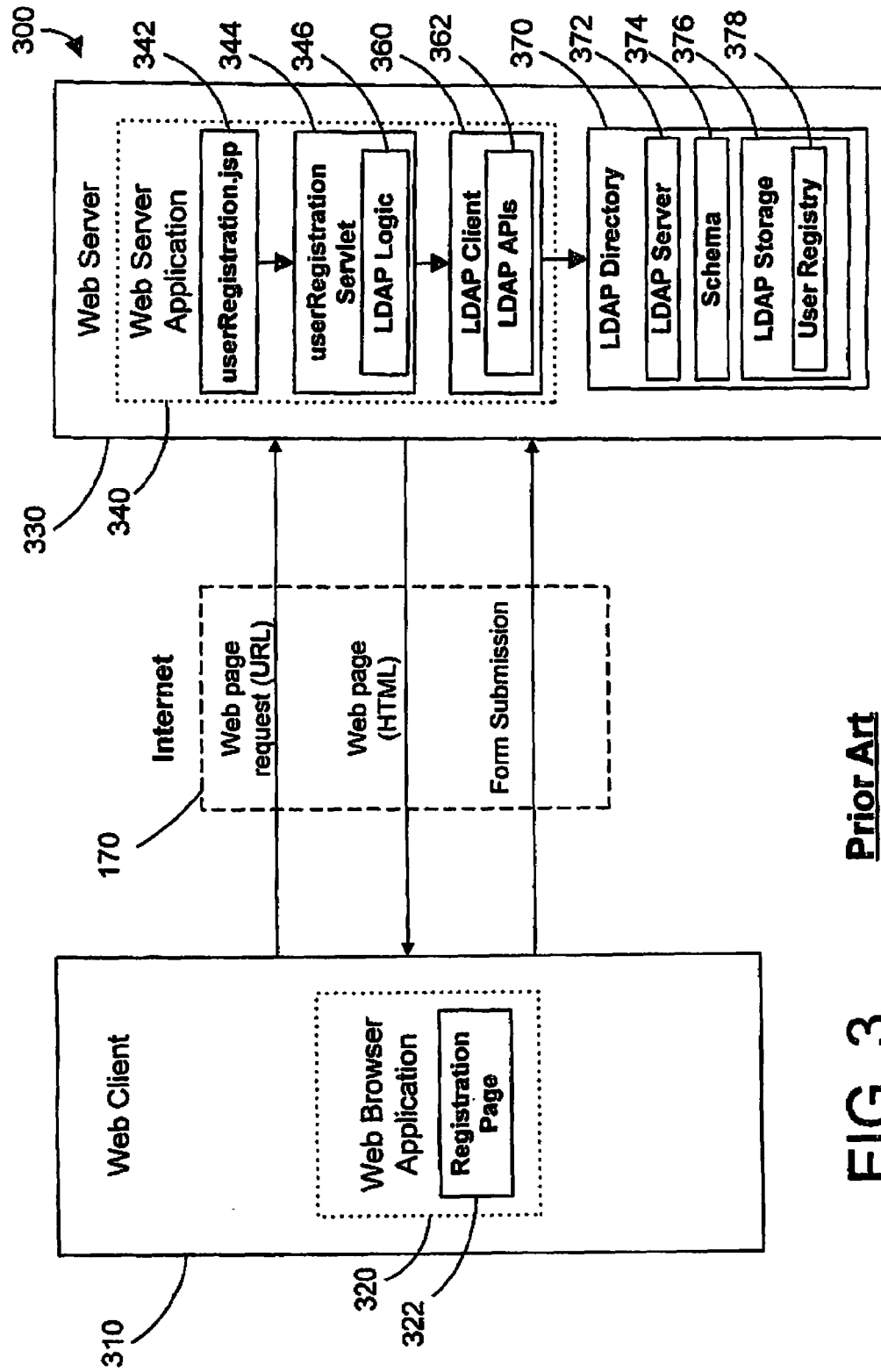
FIG. 3 is a block diagram of a prior art client/server computer system that includes a user registry implemented within a directory service.

Recent developments in web servers have recognized the value of providing an LDAP server so that multiple applications may access the same directory defined and maintained by LDAP. One suitable configuration for a prior art client/server computer system 300 that includes an LDAP directory 370 is shown in FIG. 3. A web client computer system 310 includes a web browser 320 that displays a registration page 322, which is the userRegistration.jsp page 342 after it is transmitted from web server application 340 via Internet 170 to web browser application 320. A user registration servlet 344 includes LDAP logic 346 that invokes the LDAP Application Programming Interfaces (APIs) 362 within the LDAP client 360 to access information stored in the user registry 378 within LDAP storage 376. The LDAP server 372 receives the commands from the LDAP client 360, and processes the commands according to LDAP schema 374 to access the LDAP storage 376, wherein is contained the user registry 378. Note that LDAP schema 374 is the Directory Information Tree (DIT) referenced above. Storage 376 contains a plurality of entries. These entries can have different forms depending on their relationship to the other entries as defined in the LDAP schema 374. For example, one entry may represent a company, while another entry may represent an employee of the company. Entries are typically in cleartext form and may therefore be easily read by the user or application that accesses them.

The problem with the prior art configuration shown in FIG. 3 is that each web server application 340 must include logic (e.g., 346) that knows how to invoke LDAP APIs 362 to interact with the LDAP server 372. As a result, web server application 340 includes code from a variety of different disciplines: web page presentation (e.g., design of the registration page 322); web page presentation logic (e.g., userRegistration.jsp); business logic (e.g., User Registration Servlet that processes data from the registration form and that determines what operations on the user registry are required); and directory service logic (e.g., LDAP logic 346) that knows how to accomplish the operations on the user registry in the specific directory service being used. Due to the specialization that generally occurs in the computer programming field, these different disciplines will likely require code from different programmers. As a result, a typical web server application 340 as known in the prior art in FIG. 3 may be a combination of code from several different programmers that is put together to achieve the overall desired functionality of the web server application 340. Having code from several different disciplines (and programmers) makes the web server application 340 much more difficult to maintain. It would be preferable if the code for the different disciplines could somehow be encapsulated from each other so that changes to code in one of these disciplines would not require a knowledge of the other disciplines or corresponding changes to the code in the other disciplines.

DETAILED DESCRIPTION

The preferred embodiments of the present invention achieve encapsulation between web page presentation and display logic and directory service logic so that maintenance of the code is greatly simplified. This encapsulation allows a programmer to make changes to the web page presentation and display logic without necessarily requiring changes in the directory service logic. The result is code that is much easier to maintain.

Figure 4:
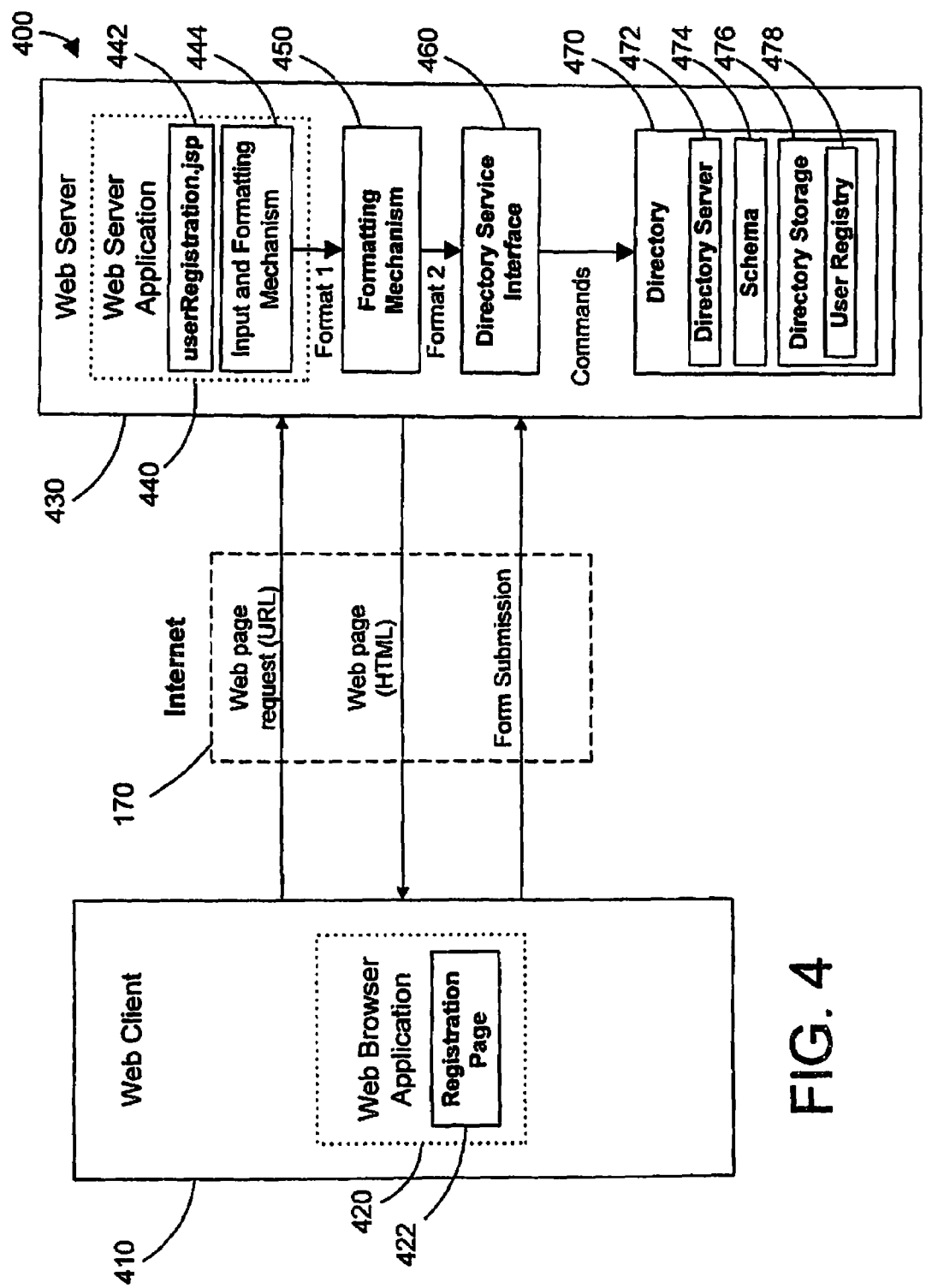
FIG. 4 is a block diagram of a client/server computer system in accordance with the preferred embodiments that converts form data to a first format, that converts the data to a second format, and that uses the data in the second format to generate commands to the directory to access the user registry within the directory.

Referring now to FIG. 4, a client/server computer system 400 includes a web client computer system 410 running a web browser 420. The web browser 420 is coupled to the Internet 170, which is, in turn, coupled to a web server computer system 430. The web server computer system 430 includes a web server application 440, a formatting mechanism 450, a directory service interface 460, and a directory 470. The web server application 440 suitably includes a web page 442, and an input and formatting mechanism 444 for receiving and formatting form data submitted to the web server application 440 by a user. The input and formatting mechanism 444 produces an output in a first format, which is input to a formatting mechanism 450, which formats data on its input into a second format. The data in the second format is then processed by the directory service interface 460, which processes the received data and generates therefrom one or more commands to the directory server 472 within the directory 470. The directory server 472 processes the commands according to the schema 474 defined for the directory 470 to access the user registry 478 within the directory storage 476.

Figure 5:
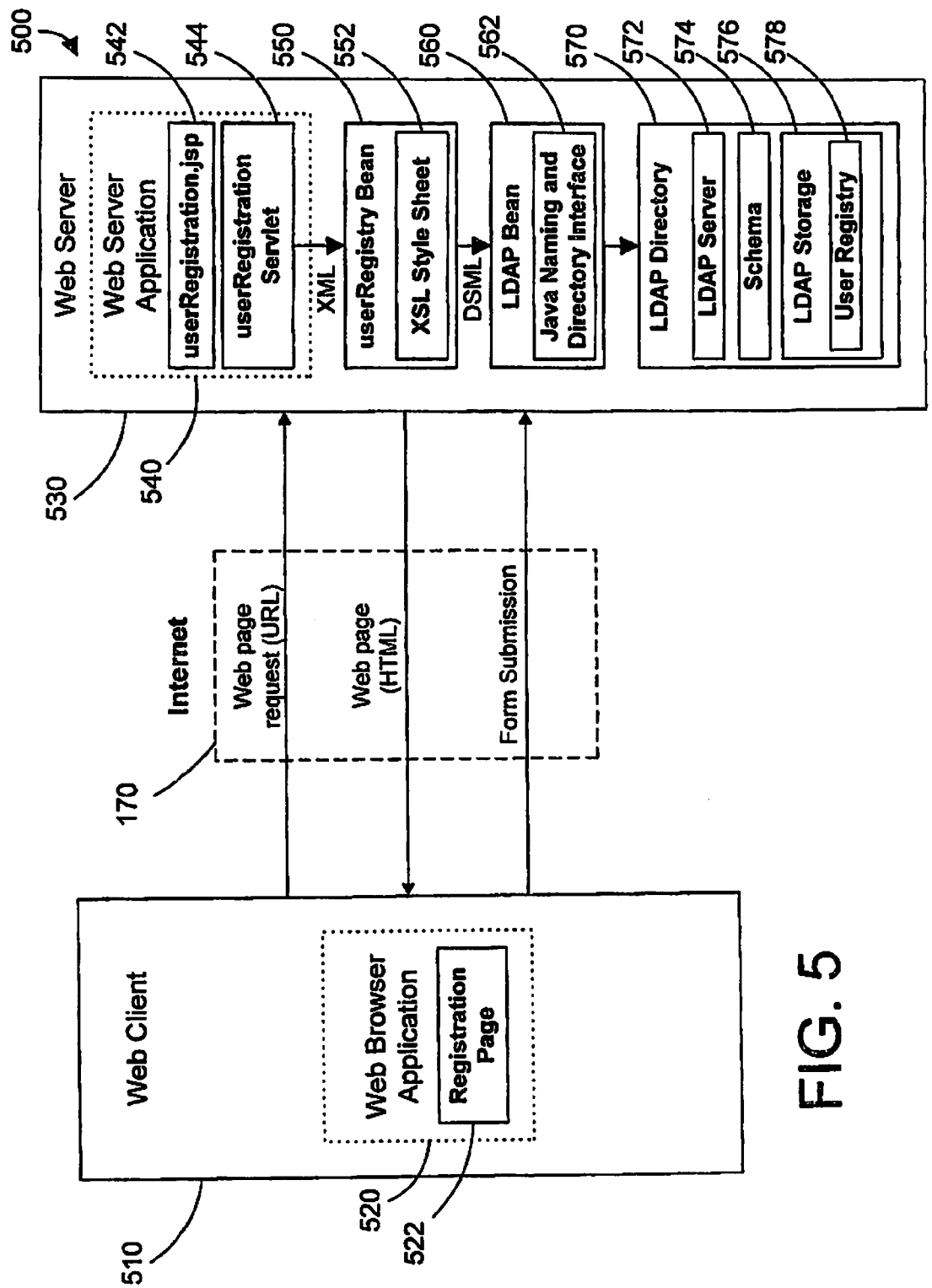
FIG. 5 is a block diagram of a client/server computer system that is one specific example of the general embodiment shown in FIG. 4 that converts form data to an XML document, that converts the XML document to a Directory Services Markup Language (DSML) document, and that uses the DSML document to dictate action that needs to be taken on the user registry within the directory service.

A specific implementation of the embodiment in FIG. 4 is shown as client/server computer system 500 in FIG. 5, which replaces the abstract implementations in FIG. 4 with more concrete implementations that will function together in an architected way. A web client 510, web browser application 520, and registration page 522 are suitably similar to the corresponding elements 410, 420 and 422 in FIG. 4. The web server computer system 530 includes a web server application 540 that includes logic to display a web page to a web browser, and that includes logic for processing form data submitted by a web browser. The userRegistration.jsp is a Java server page that defines the registration page 522 that is displayed to a user. The User Registration servlet 544 is a Java servlet that extracts data from an input form, and that generates from the extracted data an Extensible Markup Language (XML) document which is output to a UserRegistry bean 550. XML is a World Wide Web Consortium standard that lets a person create their own schema for tagging data. The UserRegistry bean 550 uses information in an Extensible Stylesheet Language (XSL) stylesheet 552 to process the XML document into a Directory Services Markup Language (DSML) document. An XSL stylesheet is simply a set of rules that describe how to convert one XML format into some output form, which is a DSML document for the specific embodiment shown in FIG. 5. DSML is an accepted specification for providing directory services via a markup language. The DSML document is output to an LDAP bean 560, which processes the DSML document and generates therefrom appropriate commands to the LDAP interface, which is termed the Java Naming and Directory Interface (JNDI). Note that JNDI is a trademark of Sun Microsystems.

Commands to the JNDI 562 result in the LDAP server 572 performing one or more operations according to its schema 574 to access the user registry 578 within LDAP storage 576. The LDAP bean 560 effectively encapsulates knowledge of the LDAP directory 570 so that a programmer can access the user registry 578 without having any knowledge of the internal workings or command syntax of LDAP.

Figure 6:
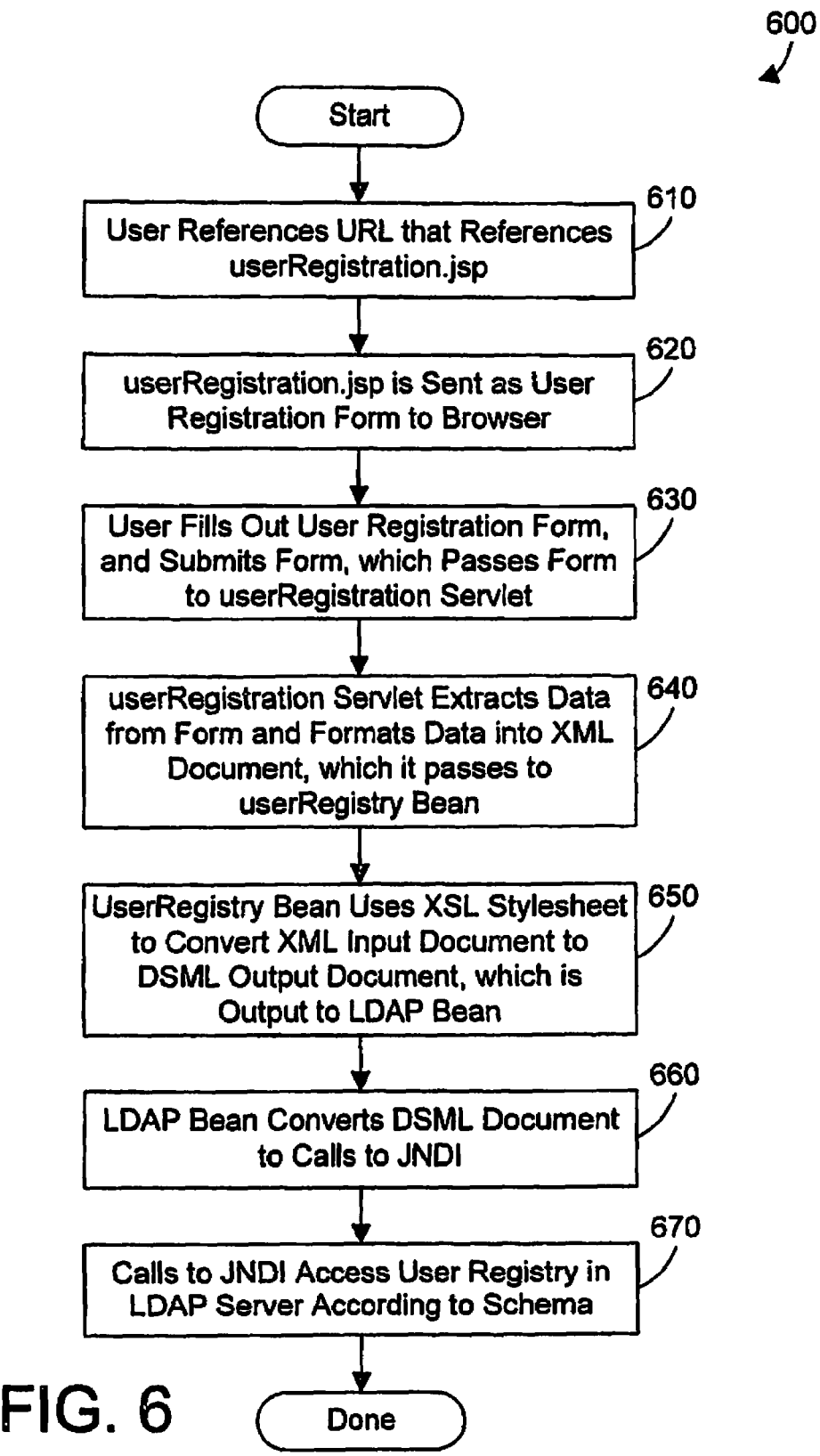
FIG. 6 is a flow diagram of a method in accordance with the preferred embodiments for using a directory service for a user registry.

Referring now to FIG. 6, a method 600 shows the steps that are suitably performed in accordance with the preferred embodiments for the specific configuration shown in FIG. 5. Method 600 begins when a user references a URL that includes a reference to a web page userRegistration.jsp (step 610). In response to the request from the user, the userRegistration.jsp web page is sent to the browser as a user registration form (step 620). The user then fills out the registration form and submits the form, which passes the form to the userRegistration servlet (step 630). The userRegistration servlet the extracts the data from the form, and formats the data into an XML document, which it passes to the userRegistry bean (step 640). Next, the userRegistry bean uses an XSL stylesheet to convert the XML document into a DSML output document, which is output to the LDAP bean (step 650). The LDAP bean then converts the DSML document to calls to the JNDI (step 660). The calls to JNDI then access the user registry in the LDAP server according to the LDAP schema (step 670).

A specific example in accordance with the client/server computer system 500 of FIG. 5 is shown in FIGS. 7-11. FIG. 7 shows a sample display window that is displaying a user registration form to a user. We assume for this example that the user registration form requests the user's first name, last name, userID, password, eMail address, and telephone number, and that a user named Joe Miller inputs his information in the appropriate fields as shown in FIG. 7. Once the user has entered the appropriate information, the user clicks on the "Submit" button 710. If the user decides not to register, the user may click on the "Cancel" button 720 to cancel the registration operation.

A suitable XML document that could represent the data in the user registration form of FIG. 7 is shown in FIG. 8. Since it is an XML document, it starts out with the standard XML header "<?xml version="1.0">". The XML document consists of elements. Each element starts and ends with a tag, which is contained within "<" and ">". An element starts with a begin tag, for example "<FirstName>" and ends with an end tag, for example "</FirstName>", which is denoted by the "/" before the tag name. The use of elements and tags is a standard XML convention. The outer most element, VisitorRegistrationInfo, describes all of the information obtained from the user during registration. Within this element are additional elements describing information about a single visitor (user). Note that the XML document defines tags FirstName, LastName, UserID, Password, eMail, and Telephone, which correspond to the fields where the user may enter information on the form (as shown in FIG. 7). Note that the values for the respective fields in FIG. 8 are the values that were entered into the form of FIG. 7 by the user. The XML document of FIG. 8 is therefore the output of the userRegistration servlet 544 shown in FIG. 5. This XML document is then passed to the userRegistry bean 550.

A suitable DSML document that could represent the data in the XML document of FIG. 8 is shown in FIG. 9. The DSML document follows the DSML 1.0 specification as defined by the DSML organization and found at the following URL: www.dsml.org. The information within a DSML document is sufficient to describe one or more directory entries. Since a DSML document is a type of XML document, the DSML document is comprised of elements, where each element is denoted with a start and end tag. A dsml:entry element describes a single directory entry. The element starts with the Distinguished Name (DN) of the directory entry to be created in the user registry containing the visitor's information. The dsml:objectclass element specifies the object classes to be used for the directory entry. These object classes are further defined in the LDAP server's schema. Each of the dsml:attr elements specify the value of a directory entry's attribute. The name of the attribute is denoted by the value of "name" parameter. The dsml:value element denotes the value of the attribute. For example, the first dsml:attr element in FIG. 9, is for the attribute "cn", which defines the user's common name, and the attribute has a value of "Joe Miller".

The userRegistry bean 550 uses an XSL stylesheet as shown in FIG. 10 to process the XML document and generate therefrom the DSML document shown in FIG. 9. Each DSML tag shown in FIG. 9 is copied to the DSML document. For the dsml:attr element, the xsl:value-of element is used to select the value from the specified XML document tag. The transformation is performed by XMLTransform class's transformXMLToDSMLDDocument method that is invoked by the UserRegistration servlet.

LDAP schema 574 is used by LDAP server 572 to identify the attributes and object classes allowed when creating directory entries. If we assume that web server computer system 530 is an IBM iSeries 400 computer system running OS/400 directory services, the LDAP schema that is provided with OS/400 directory services will need to be modified to support additional attributes for creating directory entries in the user registry. Most of the attributes needed for visitor information (such as those shown in FIG. 7) are provided with OS/400 directory services. However, one additional attribute userInterests and its corresponding object class need to be added to the schema. One suitable way to modify the LDAP schema for OS/400 V4R5 is to use the ldapmodify utility from a workstation command line, OS/400 command line, or OS/400 Qshell command line. The schema modifications must be defined in a text file in LDAP Definition Interchange Format (LDIF). The command from the OS/400 Qshell would be:

```
ldapmodify -d<admin_name>-w<admin_password>-
    f<ldif_pathname>
```

Note that when using ldapmodify from the OS/400 command line, the text file must be located in the Integrated File System (IFS), and the -h (hostname) and -p (port number) options are not required. One suitable example of the LDIF file to modify the schema is shown in FIG. 11. For this example, we use a text string to represent the object identifier of the new attribute and the object class. Lines 1 through 3 of the LDIF file shown in FIG. 11 are based on the LDIF standards and denote that the LDIF file is being used to modify the server's schema by adding a new attribute type. Lines 4 through 6 describe the attribute being added. The required information (object identifier, name, syntax, access class and length) is provided for the new attribute type. The last four lines of FIG. 11 specify modifying the server's schema by adding a new object class called Visitor. The required information for an object class (object identifier, name, superior, type of object class and optional attributes) is provided in the last line of FIG. 11. Once the schema is modified, the LDAP server is ready to be used for the user registry.

Figure 12:
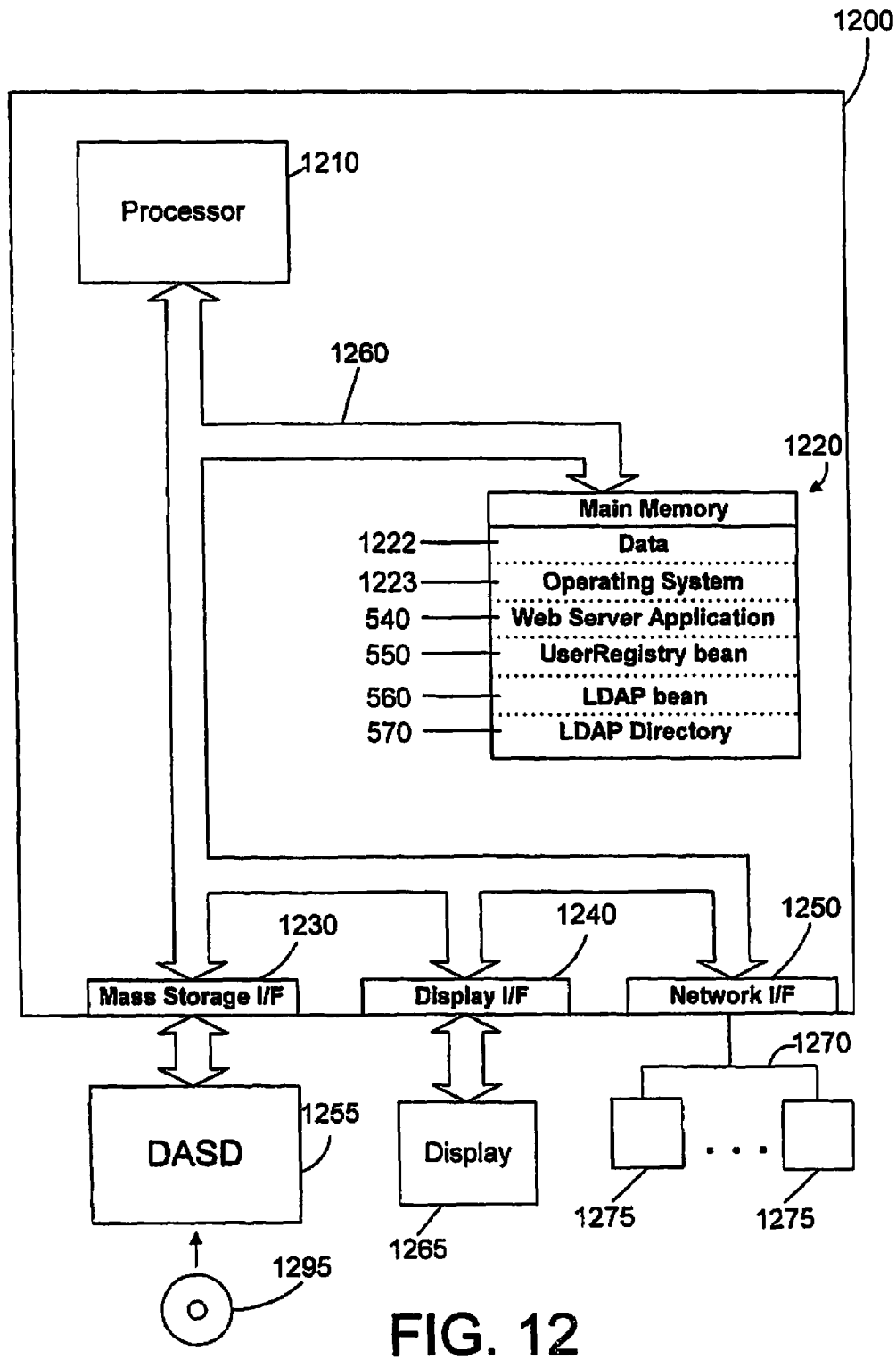
FIG. 12 is a block diagram of a web server computer system in accordance with the preferred embodiments.

Referring now to FIG. 12, one specific implementation of a web server computer system in accordance with the preferred embodiments is an IBM iSeries 400 computer system 1200. Computer system 1200 comprises a processor 1210 connected to a main memory 1220, a mass storage interface 1230, a display interface 1240, and a network interface 1250. These system components are interconnected through the use of a system bus 1260. Mass storage interface 1230 is used to connect mass storage devices (such as a direct access storage device 1255) to computer system 1200. One specific type of direct access storage device is a read/write CDROM drive, which may store data to and read data from a CDROM 1295.

Main memory 1220 in accordance with the preferred embodiments contains data 1222, an operating system 1223, web server application 540, userRegistry bean 550, LDAP bean 560, and LDAP directory 570. Computer system 1200 utilizes well known virtual addressing mechanisms that allow the programs of computer system 1200 to behave as if they only have access to a large, single storage entity instead of access to multiple, smaller storage entities such as main memory 1220 and DASD device 1255. Therefore, while data 1222, operating system 1223, web server application 540, userRegistry bean 550, LDAP bean 560, and LDAP directory 570 are shown to reside in main memory 1220, those skilled in the art will recognize that these items are not necessarily all completely contained in main memory 1220 at the same time. It should also be noted that the term "memory" is used herein to generically refer to the entire virtual memory of computer system 1200.

Data 1222 represents any data that serves as input to or output from any program in computer system 1200. Operating system 1223 is a multitasking operating system known in the industry as OS/400; however, those skilled in the art will appreciate that the spirit and scope of the present invention is not limited to any one operating system. The specific functions for each of the web server application 540, userRegistry bean 550, LDAP bean 560, and LDAP directory 570 are described above with reference to FIG. 5.

Processor 1210 may be constructed from one or more microprocessors and/or integrated circuits. Processor 1210 executes program instructions stored in main memory 1220. Main memory 1220 stores programs and data that processor 1210 may access. When computer system 1200 starts up, processor 1210 initially executes the program instructions that make up operating system 1223. Operating system 1223 is a sophisticated program that manages the resources of computer system 1200. Some of these resources are processor 1210, main memory 1220, mass storage interface 1230, display interface 1240, network interface 1250, and system bus 1260.

Although computer system 1200 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 1210. However, those skilled in the art will appreciate that the present invention applies equally to computer systems that simply use I/O adapters to perform similar functions.

Display interface 1240 is used to directly connect one or more displays 1265 to computer system 1200. Display 1265 may be simple display devices or fully programmable workstations, and are used to allow system administrators to communicate with computer system 1200.

Network interface 1250 allows computer system 1200 to send and receive data to and from any network 1270 to which the computer system may be connected, to communicate with one or more computer systems 1275 that are coupled to the network 1270. Network 1270 may be a local area network (LAN), a wide area network (WAN), or more specifically the Internet. Suitable methods of connecting to the Internet include known analog and/or digital techniques, as well as networking mechanisms that are developed in the future. Many different network protocols can be used to implement a network. These protocols are specialized computer programs that allow computers to communicate across a network. TCP/IP (Transmission Control Protocol/Internet Protocol), used to communicate across the Internet, is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as CDROM (e.g., 1295 of FIG. 12) and floppy disks, and transmission type media such as digital and analog communications links.

The preferred embodiments described above extract form data, convert it to a first format, then convert it to a second format. One might be tempted to ask why the data from the user registration form goes through two different formats. The answer lies in the desire to encapsulate different functions of a web server into compartmentalized areas of speciality according to the functions performed. For example, returning to FIG. 5, by providing the userRegistration.jsp and userRegistration servlet within the web server application 530, the presentation logic of the web server application is kept separate from the business logic provided in the userRegistry bean 550 and is kept separate from the back-end logic (e.g., in LDAP bean 560) that is required to access the user registry 578 in the LDAP directory 570. The output from the userRegistration servlet is an XML document, which is a tagged markup language document similar in syntax to HTML. Should the programmer of the presentation logic need to add a new field to a user registration form, the programmer can simply add the field in the HTML form that is rendered to the user, add a corresponding new line in the XML document type definition (DTD) that defines the document format, and add a line to the XSL stylesheet definition to account for the newly added entry. In similar fashion, the business logic is encapsulated from the presentation logic (residing in the web server application) and from the business data (residing in the LDAP directory). This allows a programmer that is familiar with Java beans and with the details of DSML and LDAP to concentrate on providing the translation from DSML to commands on the JNDI, without being concerned about the implementation within the presentation logic or the business data. Likewise, the internal implementation of the LDAP directory is hidden from the presentation logic and the business logic because the business logic simply communicates with a defined interface (e.g., JNDI), without concern for the internal implementation. This allows programmers that program the implementation of an LDAP directory to concentrate on this specialized job without having to worry about the business logic or the presentation logic. The preferred embodiments as described herein provide three distinct portions of code that are each encapsulated from the other. This arrangement makes maintenance of the code much easier, because a programmer need not be an expert in web page design, form processing, business logic, and LDAP implementation details in order to maintain their encapsulated portion of the program. Instead, each programmer can maintain his or her portion of the program without worrying about the other portions.

The apparatus, methods and program products described herein encapsulate each of a plurality of different software functions by defining a uniform interface between the different software functions to provide the functions of a user registry in a directory service. In this manner, each software function can be maintained in a more efficient manner with minimal effect on the other portions while allowing a number of different software applications to reference the same user registry.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the flow diagram of FIG. 6 and the block diagram of FIG. 12 relate to the specific example in FIG. 5 that uses an LDAP directory service, one skilled in the art will recognize that a flow diagram (similar to FIG. 6) and a block diagram (similar to FIG. 12) could be readily generated based on the broader implementation of the preferred embodiments as shown in FIG. 4. The preferred embodiments expressly extend to a method and apparatus for practicing the invention as described in FIG. 4.

I claim:

1. An apparatus comprising:
  at least one processor;
  a memory coupled to the at least one processor;
  a user registration web page residing in the memory;
  a page server mechanism residing in the memory and executed by the at least one processor that renders the user registration web page to a user;
  a user registration servlet residing within a web server application in the memory and executed by the at least one processor that receives user registration data from the user registration web page when the user submits the user registration web page and that formats the user registration data into an Extensible Markup Language (XML) document;
  a user registry Java bean residing in the memory and executed by the at least one processor that receives the XML document with the user registration data and that generates therefrom a Directory Service Markup Language (DSML) document according to information in an Extensible Stylesheet Language (XSL) stylesheet;
  a Lightweight Directory Access Protocol (LDAP) server residing in the memory and executed by the at least one processor that accesses an LDAP directory that has a plurality of entries, the plurality of entries including at least one entry that contains user registry information; and
  an LDAP Java bean residing in the memory and executed by the at least one processor that receives the DSML document and generates therefrom at least one command to the LDAP server to access the user registry information in the LDAP directory, wherein the user registry Java bean translates the XML document to the DSML document to encapsulate presentation logic of the web server application from business logic in the LDAP Java bean to access the LDAP server.

2. The apparatus of claim 1, wherein the user registration data comprises one or more attributes chosen from the group consisting of: a first name, a last name, a user identifier, a password, an eMail address, and a telephone number.

3. A method for accessing a user registry stored in an LDAP directory, the method comprising the steps of:
  (A) displaying a HTML form to a user;
  (B) receiving data in the HTML form from the user;
  (C) extracting the data from the HTML form;
  (D) formatting the extracted data into an Extensible Markup Language (XML) document in a web server application;
  (E) processing the XML document with a user registry java bean using information in an Extensible Stylesheet Language (XSL) stylesheet to generate a Directory Service Markup Language (DSML) document;
  (F) processing the DSML document in a LDAP Java bean, and generating therefrom at least one command to access the user registry in the LDAP directory, wherein the user registry java bean translates the XML document to the DSML document to encapsulate presentation logic of the web server application from business logic in the LDAP Java bean to access the LDAP server.

4. The method of claim 3, wherein the data comprises one or more attributes chosen from the group consisting of: a first name, a last name, a user identifier, a password, an eMail address, and a telephone number.

5. The method of claim 4, wherein the data comprises the user security information.

6. The method of claim 5, further comprising using the user security information to selectively allow access to a web site.

7. The method of claim 6, further comprising customizing the presentation of at least one web page according to the extracted data.

8. The method of claim 7, wherein the at least one command to access the user registry in the LDAP directory comprises Java Naming and Directory Interface (JNDI) commands.

9. The method of claim 3, farther comprising the steps of:
  adding a field in the HTML form that is presented to the user;
  adding a corresponding new line in a XML document type definition (DTD) that defines the XML document, and
  adding a line to the XSL stylesheet to account for the newly added field in the HTML form.

10. A program product comprising:
  (A) a user registration page that includes a user registration web page;
  (B) a page server mechanism that renders the user registration web page to a user;
  (C) a user registration servlet that receives data from the user registration web page and that formats the data into an Extensible Markup Language (XML) document;
  (D) a user registry Java bean residing within a web server application that receives the XML document and that generates therefrom a Directory Service Markup Language (DSML) document according to information in an Extensible Stylesheet Language (XSL) stylesheet;
  (E) a Lightweight Directory Access Protocol (LDAP) server that accesses an LDAP directory that has a plurality of entries, the plurality of entries including at least one entry that contains user registry information;
  (F) an LDAP Java bean that receives the DSML document and generates therefrom at least one command to the LDAP server to access the user registry information in the LDAP directory, wherein the user registry Java bean translates the XML document to the DSML document to encapsulate presentation logic of the web server application from business logic in the LDAP Java bean to access the LDAP server; and
  (G) tangible, computer-recordable media bearing (A), (B), (C), (D), (E) and (F).

* * * * *